Nov. 3, 1964 J. B. GROENEWEGEN 3,155,339

TAPE TENSION SENSING APPARATUS

Filed Oct. 23, 1961 2 Sheets-Sheet 1

INVENTOR.
JOHANNES BAREND GROENEWEGEN
BY
Christie, Parker & Hale
ATTORNEYS.

Nov. 3, 1964 J. B. GROENEWEGEN 3,155,339

TAPE TENSION SENSING APPARATUS

Filed Oct. 23, 1961 2 Sheets-Sheet 2

INVENTOR.
JOHANNES BAREND GROENEWEGEN
BY
Christie, Parker & Hale
ATTORNEYS.

United States Patent Office
3,155,339
Patented Nov. 3, 1964

3,155,339

TAPE TENSION SENSING APPARATUS

Johannes Barend Groenewegen, San Dimas, Calif., assignor to Consolidated Electrodynamics Corporation, Pasadena, Calif., a corporation of California Filed Oct. 23, 1961, Ser. No. 146,941
3 Claims. (Cl. 242—75.51)

This invention relates to tension-sensing apparatus. More particularly, it relates to apparatus for sensing the tension in a moving filament of magnetic recording tape.

In the digital data processing industry the use of magnectic tape as a storage medium for data has become standard in many applications. The use of such a storage medium, however, is subject to sources of inaccuracy which may ruin the accuracy of the apparatus if certain physical conditions are not continuously monitored. In a computer utilizing tape as a storage medium one of the conditions which must be monitored is the tension present in the tape as it moves through the tape guides and past heads on a tape transport deck. If the tension in the tape is too high there is a tendency for the tape to elongate.

If a particular frequency is to be recorded on the tape, elongation of the tape would result in a change of frequency. For this reason the tension applied to the tape must be held constant during a given run, as well as from run to run, so that errors will not be produced by virtue of an apparent change in a reference frequency. Conversely, if the tension in the tape is too slight, there is distinct possibility that the tape will become fouled in its guides. The tape utilized in a digital data processor usually moves at high speeds; reversing of the tape occurs very rapidly. If the tension in the tape is too little, slack may be present such that the tape may become disengaged from its guide rollers or posts. This increases the tendency for the tape to break.

In devices known heretofore, the tension in the tape has been sensed by a roller mounted to a pivot arm. The tape is fed around the roller. There is tension in the tape on either side of the roller. The resultant force acting upon the roller causes the arm to move against a predetermined loading system. The deflection of the pivot arm from a predetermined normal location is indicative of the tension in the tape. These devices, known prior to the development of this invention, required that the tape tension-sensing roller be isolated from any change in tape angle relative to the sensing roller. The change in alignment of the tape is produced as the reel upon which the tape is stored changes its effective diameter during the reeling process. Because of the philosophy present before this invention—that it was necessary to remove or to prevent any change in the angularity of the tape relative to the tension-sensing mechanism—additional roller or guide mechanisms were added to the tape path. The insertion of additional guide rollers in the tape transport deck directly increased the chances for fouling of the tape in the guide rollers. Moreover, the utilization of the tape angle isolation guides extended the path between reels which it was necessary for the tape to traverse.

This invention provides a tape tension-sensing mechanism which does not require the isolation of variations in tape angle relative to the tension-sensing roller. The apparatus of this invention is such that the phenomenon of tape angle variations is either reduced to a minimum such that it does not produce a significant error, or the phenomenon is utilized directly to provide the sensed quantity. The length of the tape path between the pair of reels is reduced. Also, the number of guides which must be used in conjunction with such a tape deck is reduced. This simplification of the tape transport deck improves tape life since there is less chance for the tape to become fouled and break. Moreover, the time necessary for threading the tape deck is reduced.

Generally speaking, this invention comprises apparatus for sensing tension in a moving filament. The apparatus includes a movable guide member. One reel of a pair of filament reels is positioned next adjacent one side of the guide member. A filament guide means is positioned next adjacent another side of the guide member to provide a filament path which is serial from the reel directly to and around at least a portion of the guide member and to the guide means. Means are provided for moving the filament along this path, the moving filament being under tension adjacent both sides of the guide member to provide a resultant force on the guide member. The invention further provides means mounting the guide member and movable relative to a predetermined position under urging by the resultant force. Deflection of the guide member is substantially tangential to a preselected component of the resultant force. Means are provided for sensing the deflection of the guide member mounting means relative to the predetermined position. The invention further includes means operatively connected to the deflection sensing means to alter the tension in the filament.

The following detailed explanation and description of the invention will be facilitated by reference to the accompanying drawings, wherein.

Before referring directly to the figures accompanying this description, an explanation of the nature of the apparatus utilized commonly in tape transport systems will be beneficial. Normally, the tape is threaded through a system of guides, electromagnetic heads, and drive members mounted between a pair of spaced-apart tape reels. Each of these tape reels is driven by a motor. The motors driving the tape reels normally have a constant voltage applied thereto such that the motor has a constant torque characteristic. As the driven reels change from a full to an empty condition, the tension in the tape adjacent each reel varies.

The torque applied is determined by the product of its torque or lever arm and of the force applied at the end of this arm. In the tape transport mechanisms commonly used, the torque arm is a variable related to the fullness of the tape reel. When the tape reel is empty the torque arm is at a minimum and, since the torque of the motor is constant, the tension in the tape must be at a high level. As the reel is filled, the torque arm increases and thus, in order to maintain constant torque, the tension in the tape must decrease. This phenomenon is the primary source of variation in tape tension in a tape transport system.

Figure 1:
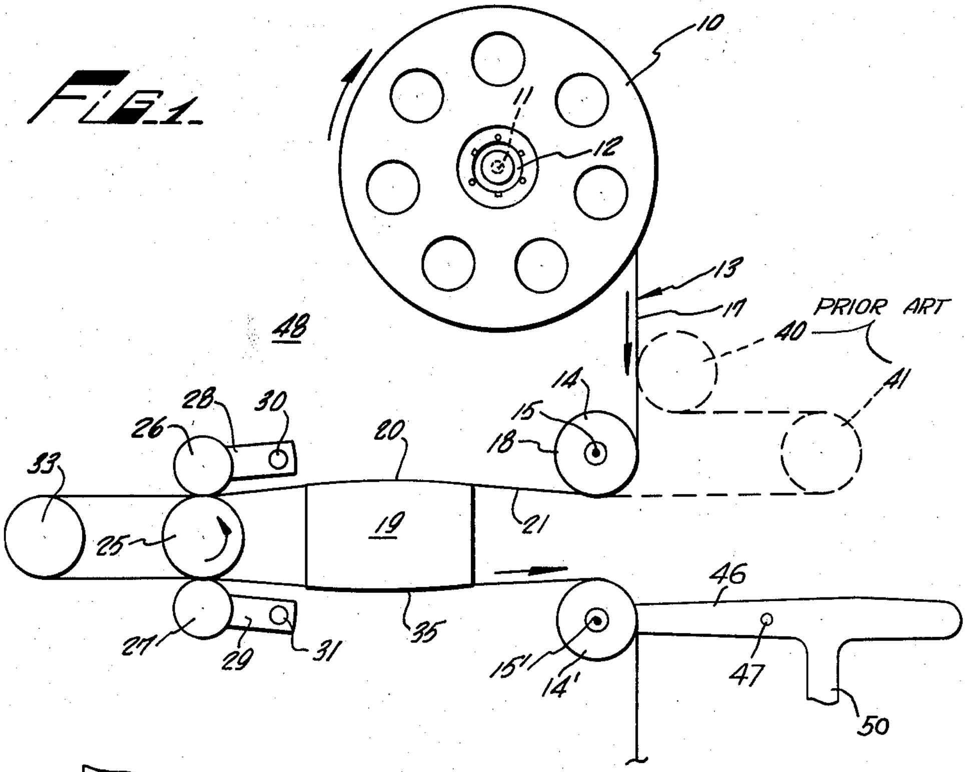
FIGURE 1 is an elevational view of a portion of a tape transport deck utilizing this invention showing one of the mechanisms for mounting a movable guide roller and showing guides according to the prior art in dotted lines.

Referring to FIGURE 1, a tape reel 10 of a pair of spaced-apart reels is illustrated; the other reel is not shown. The reel 10 is mounted and centered to a shaft 11 by a hub 12. A length of tape filament 13 has one end threaded into engagement with the drum of the reel 10. From the reel 10, the tape is passed around a rotatable and movable guide member 14. The guide member or spool 14 is rotatable about an axis 15 and, in terms of the apparatus of this invention, is the tape tension-sensing roller. It is within the scope of this invention, however, that the sensing element 14 not be rotatable if it is of a low friction bearing type such as an air bearing. The member 14 must be movable, i.e., translatable. The length of tape 13 between the reel 10 and the tape tension roller 14 is designated as tape portion 17.

The tape 13 is fed around the periphery 18 of the roller 14 and past a stationary guide means 19 in the form of a block or tape guide. The tape guide 19 has a smoothly curved upper surface extending to an upper extremity 20. The portion of the tape path between the upper extremity 20 of the tape guide 19 and the roller 15 is designated as tape path portion 21.

From the tape guide 19 the tape 13 passes adjacent a constantly rotating capstan 25 having a pair of rollers 26 and 27 adjacent thereto. The rollers 26 and 27 are mounted on pivot arms 28 and 29, respectively, pivotable about the pivot axles 30 and 31. After passing between the roller 26 and capstan 25, the tape passes over the roller 33 of a tachometer, back through the gap between the capstan 25 and roller 27, and then over the lower extremity 35 of the tape guide 19. From tape guide 19 the tape filament 13 passes over the roller 14′, mounted for rotation about axis 15′, of a second tape tension-sensing apparatus and thence to the other reel of the reel pair.

For comparison with devices of the prior art, the tape path used in such devices is illustrated by the dashed lines of FIGURE 1. A tape guide roller 40 is positioned between the tape guide 19 and a movable roller 41. The roller 40 serves to isolate variations in tape angle, as derived from the changing radius of the tape 13 on reel 10, relative to the tape tension-sensing roller 41. As can be seen readily from FIGURE 1, the apparatus of this invention results in a shorter tape path between the tape reels and provides a more easily threaded tape path.

Figure 2:
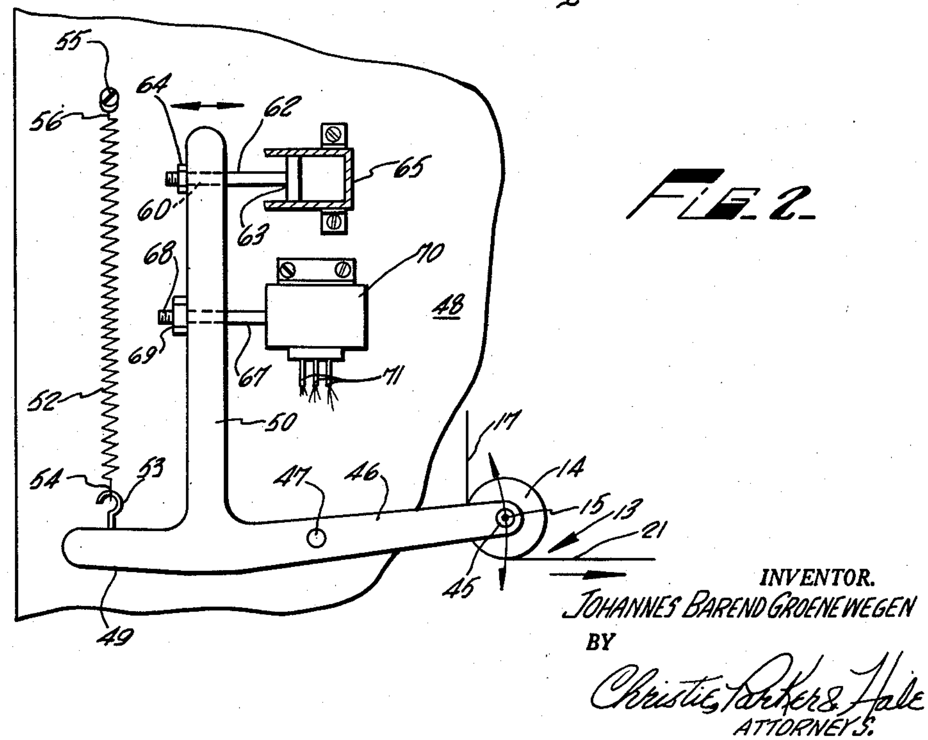
FIGURE 2 is an elevational view of the other side of the tape transport deck illustrated in FIGURE 1.

The tape tension-sensing roller 14 is mounted to an axle 45 having the axis 15. Axle 45 is mounted to a pivot arm 46 which moves about a pivot or axle 47 extending from the rear side of a tape transport deck 48 (see FIGURE 2). The pivot arm 46 has a pair of extensions 49 and 50 illustrated in FIGURE 2 as being at right angles to one another; however, it is within the scope of this invention that extensions 49 and 50 can assume other geometrical orientations without departing from the scope of this invention. A tension spring or biasing mechanism 52 is mounted between the extension 49 and tape transport deck 48. A hook 53 is engaged in the extension 49 and engages the lower end 54 of spring 52. A screw 55 is secured to the transport deck remote from the arm 46 and secures the upper end 56 of spring 52.

A pair of apertures 60 and 61 are drilled through the extension 50 and lie parallel to the plane of the transport deck 48. A rod 62 connected to a piston 63 is engaged by a nut 64 in hole 60. The piston 63 works in a cylinder 65 and functions as a dashpot or hydraulic damping mechanism. A rod 67, having a threaded end 68, is secured in aperture 61 by a nut 69. Rod 67 is the connecting rod to the core of a differential transformer 70 having leads or electrical conductors 71 connected thereto.

Figure 3:
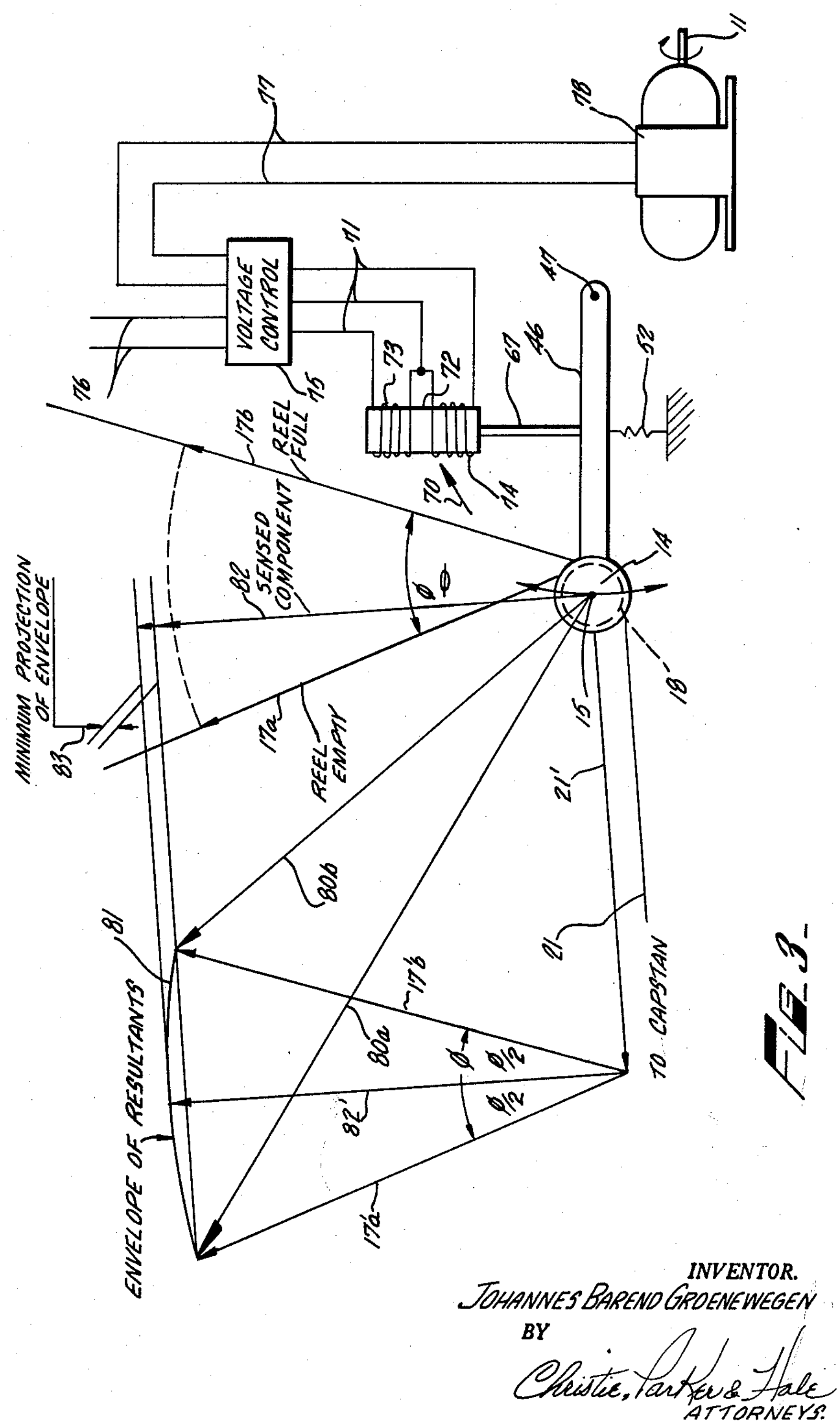
FIGURE 3 is a diagrammatic illustration of the physical forces present in one embodiment of the invention and of the geometrical relationships between the apparatus of the invention and the physical forces.

Referring to FIGURE 3, the nature of the tape tension-sensing mechanism for a closed-loop or feedback motor control system is illustrated. The differential transformer 70 has a core 72 and a pair of spaced-apart coaxial coils 73 and 74 between which the core is normally located in coaxial relation. The leads or conductors 71 from the differential transformer 70 extend to a motor voltage control and feedback system 75. Line voltage, generally at 120 volts 60 cycle A.C., is supplied to the feedback and motor voltage control 75 over conductors 76. From the voltage control 75 conductors 77 carry power to an electric motor 78 having a shaft 11 upon which is mounted the reel 10.

It will be seen that any displacement of the core of the transformer 70 results in a change in the torque of the motor to modify the tension on the tape. Thus the servo is basically a positioning servo for the roller 14 in that the servo, by controlling tension of the tape, maintains the position of the roller substantially fixed. Any deviation from the fixed position results in an error signal at the output of the transformer which is amplified and used to control the torque of the motor in a manner to bring the roller back to its initial position so as to reduce the error signal to zero, in the manner of any closed loop positioning servo. However, it is the tape tension which it is actually desired to hold constant, not the position of the roller. If the angle of the tape between the reel and the roller did not change, the servo, in holding the position of the roller fixed, would act indirectly to hold the tape tension constant, but as the angle of the tape changes, the tension on the tape must change in order for the servo to hold the roller position fixed. The invention provides the optimum angular relationship between the movement of the roller 14 and the normal positions of the tape to achieve the minimum change in tape tension between the empty and full reel conditions. This optimum relationship is illustrated by the vector diagram of FIGURE 3.

Consider first the ideal condition in which the tape tension is assumed to be constant. The tape 17, in going between the reel 10 and the roller 14, varies over an angle $\phi$ in its path from a reel empty position **17*a* to a reel full position 17*b*. The tape is directed along a path 21 between the roller 14 and the capstan. Vectorially, all the forces acting on the roller may be considered as going through the center of the roller since the roller is free to turn. The vector 21′ represents the force vector due to tension in the tape between the roller and capstan and is parallel to the tape at 21. Likewise, the vectors 17′*a* and 17′*b* represent the force vectors due to the tension in the tape between the roller and reel in the two extreme positions and are therefore parallel to the tape at positions 17*a* and 17*b*** respectively.

The positioning servo with the roller 14, arm 46, spring 52 and transformer 70 for sensing displacement can only respond to the component of force acting on the roller tangent to the path of movement of the roller. Thus only the force represented by the vector 82 in FIGURE 3 acts to displace the roller and actuate the servo. The orientation of the vector 82 may be at any angle in relation to the tape depending on the orientation of the arm 46 and associated spring 52 and transformer 70. Since it is the vector 82 that is held constant by the servo, it is necessary to select the orientation of the arm 46 and associated spring 52 and transformer 70 (and therefore the orientation of the vector 82) so there is a minimum change in tape tension with the variation tape angle $\phi$.

This minimum condition is effected by selecting the proper angle of component vector 82. As shown by the vector diagram of FIGURE 3, the component vector 82 is selected according to the present invention so as to be parallel to the plane or line of the minimum projection 82 of the envelope 81. It will be seen that the component force vector 82 is therefore the component that is equal in magnitude and direction for both the resultant **80*a* and 80*b*, the two limiting conditions of the resultant vector acting on the roller 14** in the reel empty and reel full conditions.

However, the tape tension is not actually held constant. The positioning servo, in maintaining the position of the roller constant, only acts to maintain the component force 82 constant. This requires that the tape tension vary in magnitude with changes in angle so that the component 82 is constant. Only if the component 82 is selected as described does the servo produce the minimum change in tape tension.

A parallel vector 82', also perpendicular to the rays defining the minimum projection 83, is by the rules of plane geometry the bisector of the angle between the vectors 17'*a* and 17'*b*. In other words, the axis 15 of roller 14, being constrained by the link 46 and pivot 47 to move along a path tangent to the vector 82, necessarily moves along a path parallel to the bisector of the angle $\phi$ subtended by the tape in the extreme positions 17*a* and 17*b*. It follows therefore that in order for the positioning servo to operate to maintain tape tension as near as possible to a constant condition, the orientation of the arm 46 and roller 14 must be selected so that the vector 82 is parallel to the bisector of the angle $\phi$ formed by the tape in its two limiting positions with the reel full and the reel empty.

The null position sensing transducer 70, illustrated in FIGURE 3, has a collateral feature over and above that of sensing the tension in the tape 13. If the voltage supplied to the tape transport machinery over conductors 76 is subject to variations, these variations will be reflected in the torque of motor 78. These variations may be increases or decreases relative to the normal line voltage applied to conductors 76. Since the transducer 70 is arranged to sense variations in the component 82 of the resultants between limits 80*a* and 80*b*, the transducer 70 may also be utilized as a line voltage regulator or monitor as well as a voltage regulator responsive to tape tension. The apparatus of FIGURE 4, on the other hand, is dependent for successful and accurate operation upon the line voltage supplied control mechanism 75' being constant so that variations in the tension of tape 13 are manifested only by the change in diameter of the tape 13 on the reel 10.

The tape tension-sensing apparatus associated with roller 15 is operable when the tape 13 is moving at its normal speed. The capstan 25 is normally continuously rotating. If the reels, of which reel 10 is one of a pair, are stopped, the capstan 25 continues to rotate but the rollers 26 and 27 adjacent the capstan 25 are removed from engagement with the tape 13 by pivoting the lever arms 28 and 29. When it is desired to have the tape 13 moved in either direction relative to the tape guide 19, the lever arms 28 and 29 are indexed so that the rollers 26 and 27 clamp the tape 13 against the capstan 25. This induces movement of the tape 13 between the pair of reels. The tape speed is monitored by the tachometer 33. When the tape is moving at its proper speed relative to the tape guide 19, a relay (not illustrated) closes and the functions of the tape tension-sensing apparati 15 and 15' are then effective to regulate the tension in tape 13.

The tension-sensing apparatus described above has applications other than that of the environment referred to above. Such apparatus finds utility not only in data processing machinery utilizing magnetic tape as the memory medium, but also in any apparatus where the tension of a filament relative to a reel is to be sensed. The limiting requirement of such devices is that the paths of the filament on either side of the tension-sensing roller vary according to known patterns. In the description above, the tape path portion 21 is substantially fixed relative to the tape tension-sensing roller 15, but this is true because of the specific environment with which the invention is described. A filament path corresponding to tape path 21 may vary in a manner similar to the variation in the tape path 17 between the reel 10 and the tension-sensing roller 15. Such a variation of the filament path 21 will not render the apparatus inoperable so long as the relationship between the movements of the paths 17 and 21 is known such that the vectorial characteristics of the resultant vector may be known.

While the invention has been described above in conjunction with specific apparatus, this has been by way of example only and is not to be considered as a limitation to the scope of this invention.

I claim:

1. A tape transport comprising a reel for storing tape wound on the reel, means for applying a controllable torque to the reel in either direction, means engaging the tape for driving the tape at a predetermined speed, a guide member engaging the tape adjacent the reel, the tape passing around a portion of the guide member so as to change direction as the tape passes between the reel and the tape driving means, the tape path varying over an angle between the reel and the guide member as the amount of tape on the reel changes between full and empty, means movably supporting the guide member, said supporting means constraining the movement of the guide member along a path lying substantially parallel to a line bisecting said angle, means associated with the supporting means for urging the guide means along said path in a direction away from the reel, said last-named means changing the urging force on the guide member with changes in position of the guide member in opposition to the force produced on the guide member by the tape, whereby the position of the guide member is controlled by the tension in the tape, means for sensing the position of the guide member, and means responsive to the sensing means for controlling the torque applying means to adjust the tape tension.

2. Apparatus as defined in claim 1 wherein the supporting means includes an arm on which the guide member is supported, the arm being pivotally supported at a point spaced from the guide member such that the pivot point and guide member lie along a straight line extending substantially perpendicular to said bisecting line when the guide member is in its normal operating position.

3. A tape transport comprising a reel for storing tape wound on the reel, means for applying a controllable torque to the reel in either direction, means engaging the tape for driving the tape at a predetermined speed, a guide member engaging the tape adjacent the reel, the tape passing around a portion of the guide member so as to change direction as the tape passes between the reel and the tape driving means, the tape path varying over an angle between the reel and the guide member as the amount of tape on the reel changes between full and empty, means movably supporting the guide member, said supporting means constraining the movement of the guide member along a path lying parallel to a line substantially bisecting said angle, means associated with the supporting means for urging the guide means along said path in a direction away from the reel, said last-named means changing the urging force on the guide member with changes in position of the guide member in opposition to the force produced on the guide member by the tape, whereby the position of the guide member is controlled by the tension in the tape, means for sensing the position of the guide member, and means responsive to the sensing means for controlling the torque applying means to adjust the tape tension.

References Cited by the Examiner

UNITED STATES PATENTS

| | | | |
|---|---|---|---|
| 1,153,887 | 9/15 | Blair | 242—75.51 |
| 1,857,817 | 5/32 | McCann | 242—75.51 |
| 2,259,241 | 10/41 | Cook | 242—75.51 |
| 2,725,200 | 11/55 | Ward | 242—55.14 |
| 2,985,396 | 5/61 | Johnson | 242—75.51 X |

MERVIN STEIN, *Primary Examiner.*

JOSEPH P. STRIZAK, RUSSELL C. MADER, *Examiners.*